United States Patent [19]

Cape

[11] 4,019,011
[45] Apr. 19, 1977

[54] METHOD OF AND APPARATUS FOR HARD FACING POPPET VALVES

[75] Inventor: Arthur T. Cape, Monterey, Calif.
[73] Assignee: Coast Metals, Inc., Little Ferry, N.J.
[22] Filed: Jan. 27, 1975
[21] Appl. No.: 544,054
[52] U.S. Cl. ............................ 219/76; 219/123
[51] Int. Cl.² ...................... B23K 9/04; B23K 9/08
[58] Field of Search ............... 219/76, 77, 75, 123, 219/74, 137

[56] References Cited

UNITED STATES PATENTS

| | | | |
|---|---|---|---|
| 2,826,671 | 3/1958 | Gayley | 219/75 |
| 2,920,183 | 1/1960 | Greene | 219/123 |
| 2,982,845 | 5/1961 | Yenni et al. | 219/74 X |
| 2,998,922 | 9/1961 | Gibson | 219/76 X |
| 3,028,479 | 4/1962 | Tauschek | 219/76 |
| 3,433,924 | 3/1969 | Sevenco | 219/123 |
| 3,743,815 | 7/1973 | Woods | 219/76 |
| 3,825,712 | 7/1974 | Gibbs | 219/123 X |

*Primary Examiner*—J. V. Truhe
*Assistant Examiner*—N. D. Herkamp
*Attorney, Agent, or Firm*—Isler and Ornstein

[57] ABSTRACT

A method and apparatus is described for coating or hard facing the working surface of a poppet valve, in which a uniformly distributed coating is obtained without dilution of the deposited metal, and without requiring preheating of the valve or its working surface. A non-consumable electrode and a consumable electrode or rod are held in position above the working surface of the valve, and an arc is struck between the tungsten electrode and the end of the rod, while avoiding contact of the arc with the working surface. As the rod is consumed by the arc, the valve is rotated about its axis and the drops of molten metal are uniformly distributed on the working surface, by the use of a magnetic field for controlling such distribution. A heat sink is used to dissipate any build up of heat in the area of the deposit.

12 Claims, 1 Drawing Figure

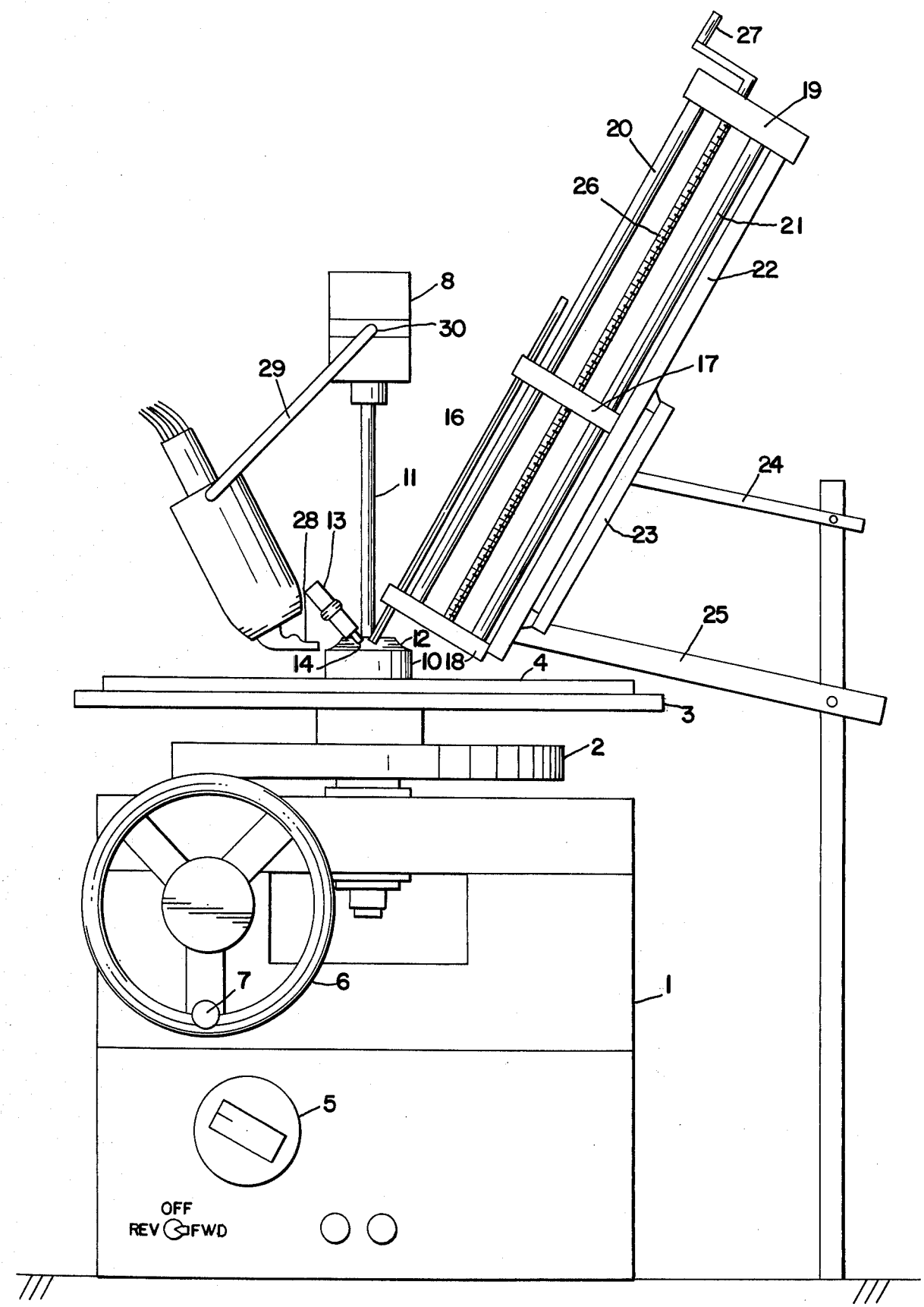

METHOD OF AND APPARATUS FOR HARD FACING POPPET VALVES

This invention relates, as indicated, to the hard facing or coating of poppet valves, but has reference more particularly to a method in which an inert gas shielded tungsten arc welding process or method is employed to hard face or coat the wearing surface of the valve.

Inert gas shielded non-consumable electrode welding processes include inert gas shielded tungsten-arc (GTA) welding. In this method of arc welding, a non-melting tungsten electrode is used. The welding arc is struck between the tungsten electrode and the work and produces the heat necessary for melting the edges or surfaces of the parts to be joined. A blanket of inert gas shields the end of the electrode, the arc, and the molten metal from the atmosphere. Where required, filler metal may be added by feeding it into the arc. The process is commonly known as tungsten inert gas, or TIG welding.

Tig welding is a very versatile welding method and can be used on most metals presently used in industry. It has also been used for welding various combinations of dissimilar materials, for hard surfacing of steels, and local melting of metals.

In hard facing or coating the working surfaces of poppet valves, however, it is desirable to utilize such a welding method, but to avoid any contact of the arc with such working surface of the valve, since this may cause an increment to be dissolved into the deposit, which is then substantially diluted.

In prior methods of hard facing or coating the working surfaces of poppet valves, such, for example, as those disclosed in Wagner U.S. Pat. No. 2,301,763, Longoria U.S. Pat. No. 2,377,163 and Cape U.S. Pat. No. 2,708,641, it is necessary to preheat the working surface of the valve to a relatively high temperature before application of the hard facing metal to such surface.

Such preheating involves the use of expensive equipment which materially increases the cost of coating the valves, and can cause distortion of the valve and interference with the coating procedure.

I have found that the working surfaces of such poppet valves can be effectively coated or hard-faced, without creating the dilution to which reference has been made, and without preheating the valve, by a method in which Tig welding is employed, using a relatively large welding rod of hard-facing metal, i.e., a rod of relatively large diameter, held in position above the prepared working surface of the valve, striking an arc between the tungsten electrode and the end of the rod, while avoiding striking an arc between the tungsten electrode and such working surface of the valve, advancing the welding rod, as it is consumed, into the tungsten arc, rotating the valve about its axis, controlling the position of the rod so that as the valve rotates, the drops of molten metal are so distributed as to cover uniformly the surface of the valve seat, such distribution being effected by the use of a magnetic field.

For the purpose of controlling the arc, and thus insuring the uniform distribution of the molten metal on the surface of the valve seat, a welding-arc control system is utilized, known as the Cyclomatic welding-arc control.

The cyclomatic control is manufactured by Celesco Industries, a division of The Susquehanna Corporation, of San Diego, Calif., and is a solid state system for directly controlling and/or manipulating the position or motion of the welding arc. It operates on the principle of generating a controlled magnetic field which interacts with the magnetic field of the welding arc, resulting in precisely controllable forces being applied to the arc itself and placing the welding energy exactly where it is needed.

The equipment includes two devices: a control unit which is basically a low-frequency power oscillator that generates the required current waveforms to control position of the arc and the frequency of oscillation, and an electromagnetic probe that is mounted on the welding torch and develops the magnetic field that creates those controllable forces which are applied to the arc.

The method may be best explained by reference to the accompanying drawing, which is a part of this application and in which the single view shows, in a somewhat diagrammatic manner, an arrangement or set up for coating or hard facing the working surface of a poppet valve.

In the drawing, reference numeral 1 designates a cabinet which houses a motor and other parts, for rotating a turntable 2 on which is superimposed or supported a heat sink consisting of an aluminum plate 3 and a copper plate 4. The speed of rotation is controlled by a control 5.

The position of the turntable 2 may be adjusted vertically by a wheel 6, which is rotatable by a handle 7.

The valve which is to be coated is mounted, in inverted position, on the heat sink 4, and is supported between the heat sink 4 and a holder 8. The valve comprises a head 10 and a stem 11, and the valve seat, which is to be coated, is designated by reference numeral 12.

A Tig torch, of conventional design, is designated by reference numeral 13, and is provided with a tungsten electrode 14, the tip of which is supported adjacent the valve seat 12 in the manner shown. An inert shielding gas, such as argon, is passed through the torch 13 during the valve seat coating operation. An electric current is supplied to the tungsten electrode, from a power source (not shown), which may be a Hobart Cyber-Tig, which is manufactured by Hobart Brothers Company, of Troy, Ohio.

A welding rod 16, of a hard-surfacing alloy is utilized to supply the metal for coating the valve seat 12, and is supported at an inclination of about 30° to the axis of the valve stem 11.

The welding rod 16 is mounted in a rod holder or clamp 17, which is mounted for longitudinal movement along a frame or support comprising end members 18 and 19, guide elements 20 and 21, and a support member 22.

The support member 22 is mounted on a plate 23, which is supported by arms or levers 24 and 25.

As the metal at the lower end of the rod 16 melts, the rod is advanced toward the valve seat 12 by means of a screw 26, which is threadedly connected to the holder or clamp 17, and the ends of which are mounted in the members 18 and 19. The screw 26 is provided with a handle 27, by means of which the screw may be rotated to advance the rod 16 toward the valve seat 12.

For the purpose of controlling the arc, and thus insuring uniform distribution of the molten metal from the rod 16 on the valve seat 12, a welding-arc control system is utilized, comprising a control unit (not shown), and an electromagnetic probe 28, which is supported for pivotal movement by a lever or arm 29, which is pivotally connected, as at 30, to the holder 8.

The control unit, to which reference has been made, is a Model 70A Cyclomatic unit, which is manufactured by Celesco Industries, a division of The Susquehanna Corporation, of San Diego, Calif., and is described in their catalog bearing No. 72164-2-1172. The electromagnetic probe 28 is a water-cooled Cyclomatic Probe Part No. 4604, which is manufactured by that company, and is described in their catalog entitled "Cyclomatic Electromagnetic Probes."

In coating the valve surface 12, the rod 16 is held above the prepared surface 12, in the position approximately shown in the drawing.

An arc is then struck between the tungsten electrode 14 of the torch 13, and the lower end of the welding rod 16, precaution being taken that the arc does not touch the surface 12 of the valve. The arc is protected by the inert gas atmosphere, to which reference has been made.

This arc melts the end of the rod 16, permitting the molten metal to fall on the valve surface 12, without any contact of the arc with the valve.

The rod 16 is advanced, as it is consumed, into the tungsten arc, while the flow of inert gas protects the rod and the area on which the metal is deposited.

During this procedure, the valve is rotated about its axis, and the position of the rod 16 is controlled, so that as the valve rotates, the drops of molten metal cover uniformly the surface 12 of the valve. This uniform distribution of the molten metal is effected, in a desired manner, by the magnetic field which is applied by the Cyclomatic control unit 70A and the Cyclomatic probe assembly No. 4604.

It is thus seen that I have provided a method and apparatus for coating or hard facing the working surface of a poppet valve, without dilution of the deposited coating or hard facing metal, and without requiring preheating of the valve, while, at the same time, assuring a uniform distribution of the hard facing metal about such working surface.

The magnetic control, which has been described, is vital particularly when using a cast welding rod of large diameter, i.e., 5/16 inch, for coating a small valve. The use of a rod of large diameter has several advantages, including the fact that the rate of application is substantially increased over the rate obtained with a rod of small diameter.

In the drawing, the rod 16 is held at the 30° angle to which reference has been made, where the rod is of ¼ inch diameter. However, where the rod is of larger diameter, i.e., 5/16 inch, the rod is maintained at a greater angle to the axis of the valve stem 11, that is to say, at an angle of approximately 50°, since this facilitates the striking of an arc with the lower end of the rod.

As previously stated, it is imperative that the arc is struck between the tungsten electrode and the welding rod, and not on the working surface of the poppet valve, since if the arc is struck on the working surface, an increment is dissolved into the deposit which is then substantially diluted.

If the rod 16 is not in the correct position and is not properly advanced, then blobs of metal will not run consecutively together on the seat or working surface of the valve to form a uniform deposit. This uniformity is also due to the rotating of the valve and the magnetic control. The electromagnetic probe is, of course, a part of the Cyclomatic control.

The copper heat sink is designed to get rid of the heat in the area of the deposit as quickly as possible.

It will be understood that various changes may be made in the method and apparatus, without departing from the spirit of the invention or the scope of the appended claims.

Having thus described my invention, I claim:

1. In a method of coating the working surface of a poppet valve with hard facing material, the steps of supporting the valve with its working surface facing upwardly, striking an arc between a non-consumable tungsten electrode and the end of a rod of said hard facing material, whereby to cause metal from said rod to melt and be deposited on said working surface, rotating said valve about its axis during said melting, and electromagnetically controlling the distribution of said molten metal on said working surface.

2. The method, as defined in claim 1, wherein contact of said arc with said working surface is avoided during deposition of said metal.

3. The method, as defined in claim 1, wherein said rod is advanced toward said working surface as it is consumed.

4. The method, as defined in claim 1, wherein heat is conducted away from said valve during the coating of said working surface.

5. The method, as defined in claim 1, wherein the arc and the area of deposit is protected by an inert gas.

6. The method, as defined in claim 1, wherein the working surface of the valve is not preheated, preparatory to the coating operation.

7. The method, as defined in claim 1, wherein said tungsten electrode and rod are supported at an inclination to said working surface.

8. Apparatus for coating the working surface of a poppet valve with a hard facing material, said apparatus comprising a turntable for supporting and rotating said valve about its axis, with said working surface facing upwardly, a torch having a tungsten electrode supported at an inclination to said working surface, a rod of said hard facing material supported at an inclination to said working surface, means for striking an arc between said tungsten electrode and the lower end of said rod, to cause the end of said rod to melt and means for electromagnetically controlling the distribution of said melted material on said working surface.

9. Apparatus, as defined in claim 8, including means for flowing an inert gas to said arc and the area of said deposit.

10. Apparatus, as defined in claim 9, including means for advancing said rod toward said working surface as the rod is consumed.

11. In a method of coating the working surface of a poppet valve with hard facing material, the steps of supporting the valve with its working surface facing upwardly, striking an arc between a non-consumable tungsten electrode and the end of a rod of said hard facing material, whereby to cause metal from said rod to melt and be deposited on said working surface, rotating said valve about its axis during said melting, and electromagnetically controlling arc position to effect distribution of said molten metal on said working surface.

12. Apparatus for coating the working surface of a poppet valve with a hard facing material, said apparatus comprising a turntable for supporting and rotating said valve about its axis, with said working surface facing upwardly, a torch having a tungsten electrode supported at an inclination to said working surface, a rod of said hard facing material supported at an inclination to said working surface, means for striking an arc between said tungsten electrode and the lower end of said rod, to cause the end of said rod to melt and means for electromagnetically controlling the arc position to effect distribution of said melted material on said working surface.

* * * * *